US006959252B2

(12) United States Patent  
Tai et al.

(10) Patent No.: US 6,959,252 B2  
(45) Date of Patent: Oct. 25, 2005

(54) METHOD FOR ANALYZING IN-LINE QC TEST PARAMETERS

(75) Inventors: Hung-En Tai, Taipei Hsien (TW); Haw-Jyue Luo, Hsin-Chu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 22 days.

(21) Appl. No.: 10/604,244

(22) Filed: Jul. 3, 2003

(65) Prior Publication Data

US 2005/0004773 A1 Jan. 6, 2005

(30) Foreign Application Priority Data

Dec. 31, 2002 (TW) ...................... 091138166 A

(51) Int. Cl.⁷ .......................... G06F 19/00; G01R 31/26
(52) U.S. Cl. .......................................... 702/84; 438/14
(58) Field of Search .......................... 702/84; 700/109; 438/14

(56) References Cited

U.S. PATENT DOCUMENTS

| 5,761,064 | A | * | 6/1998 | La et al. ..................... 700/110 |
| 6,154,714 | A | * | 11/2000 | Lepejian ..................... 702/118 |
| 6,265,232 | B1 | * | 7/2001 | Simmons ..................... 438/14 |
| 6,314,379 | B1 | * | 11/2001 | Hu et al. ..................... 702/81 |
| 6,477,432 | B1 | * | 11/2002 | Chen et al. ..................... 700/51 |
| 6,477,685 | B1 | * | 11/2002 | Lovelace ..................... 716/4 |
| 6,613,590 | B2 | * | 9/2003 | Simmons ..................... 438/14 |
| 6,618,682 | B2 | * | 9/2003 | Bulaga et al. ..................... 702/84 |
| 6,708,073 | B1 | * | 3/2004 | Heavlin ..................... 700/121 |

OTHER PUBLICATIONS

Lee, J., Design of Intelligent Data sampling Methodology Based on Data Mining, Oct. 2001, IEEE Transactions on Robotics and automation, vol. 17, No. 5, pp. 637–649.*

Mieno et al., Yield Improvement Using Data Mining System, 1999 IEEE, pp. 391–394.*

Fan et al., Data Mining and Fault Diagnosis Based on Wafer Acceptance Test Data and In–line Manufacturing Data, IEEE 2001, pp. 171–174.*

Scher et al., In–line Statistical Process Control and Feedback for VLSI Integrated Circuit Manufacturing, IEEE 1989, pp. 70–75.*

Nurani et al., In–line Defect Sampling Methodology in Yield Management: An Integrated Framework, Nov. 1996, IEEE Transactions on Semiconductor Manufacturing, vol., 9 No. 4, pp. 506–517.*

* cited by examiner

Primary Examiner—John Barlow
Assistant Examiner—Toan M. Le
(74) Attorney, Agent, or Firm—Winston Hsu

(57) ABSTRACT

A method for analyzing in-line QCtest parameters is used to analyze a plurality of lots of products, each lot of products having a lot number and being formed using a plurality of equipments. At least one wafer of each lot of products is tested by at least one in-line QC test item to generate an in-line QC test parameter. The in-line QC test item, a sample test item and a wafer test item related to the in-line QC test item are stored in a database. The database further stores the in-line QC test parameter and data of a plurality of lots of high-yield product stocks, such as various test items and test parameters. The method includes the following steps: analyzing the in-line QC test parameter to determine whether the in-line QC test parameter corresponds to a predetermined spec or not; searching the database to find out the sample test item or the wafer test item related to the in-line QC test item when the in-line QC test parameter does not correspond to the predetermined spec; searching the database to find out the corresponding test parameters of the high-yield product stocks according to the in-line QC test item and the searched sample test item or the wafer test item; and generating a correlation to illustrate the relationship between the in-line QC test item and the sample test item, or the relationship between the in-line QC test item and the wafer test item according to the searched high-yield product stocks.

18 Claims, 7 Drawing Sheets

METHOD FOR ANALYZING IN-LINE QC TEST PARAMETERS

BACKGROUND OF INVENTION

1. Field of the Invention

The present invention relates to a method for analyzing process parameters, and more particularly, to a method for analyzing in-line quality control (QC) test parameters.

2. Description of the Prior Art

In a semiconductor manufacturing technique, many processes, such as the photolithography processes, the etching processes, and the ion implantation processes are required to complete the fabrication of a semiconductor product. That means a large number of equipments and complicated procedures are utilized in a semiconductor manufacturing process. Therefore, those of ordinary skill in the art are concentrated on ensuring the proper operation of equipments, sustaining or improving production yields, detecting and verifying problems, and periodically maintaining facilities for production, etc, so as to maintain the company's operation in good progress and produce products having good quality.

In order to identify the semiconductor processing problems, the following data, such as the process parameter data, the in-line QC test data, the defect inspection data, the sample test data, the wafer test data, and the final test data, are analyzed. The in-line QC test data refers to the data obtained from QC tests of the wafer in process, and the QC tests are usually executed after certain process steps.

FIG. 1 is a flow chart of a prior art method for analyzing in-line QC test parameters. As shown in FIG. 1, a step 101 is first executed to do tests of an in-line QC test item, such as a film-thickness test, to each wafer. A step 102 is thereafter executed to observe the results of the in-line QC test item of each wafer, so as to find out the products having abnormal in-line QC test results. Normally, the in-line QC test item to be observed is the process item executed in the last process step.

Those skilled in the art then performs a step 103 to use personal experience and the in-line QC test parameters of the abnormal products found from the step 102 to determine the possibly faulty process step, such as the thermal oxidation equipment, the silicon nitride deposition equipment, the polysilicon deposition equipment, etc.

Finally, a step 104 is used to check the various equipments used in the possibly faulty process step that is determined in the step 103, so as to find out the ill-functioned equipment. For example, when the thickness of the silicon nitride layer is found abnormal, the faulty process step is determined to be the deposition step of the silicon nitride layer, and the ill-functioned equipment is possible to be the deposition equipment, the etching equipment, etc.

Referring to FIG. 2 of a flow chart of another prior art method for analyzing in-line QC testparameters, in-line QC test results are used to predict the yield of the subsequent process to improve utility of the semi-finished products. At the beginning of the method, a step 201 is performed to execute tests of anin-line QC test item to each wafer, such as a film-thickness test. Following that, a step 202 is performed to observe the results of the in-line QC test item of each wafer to find out the products having abnormal in-line QC test results.

When the in-line QC test item of the products is found abnormal, two methods are typically used: one is shown as a step 203, abandoning the lot of products as failed products; the other is shown as a step 204, predicting whether the lot of products can pass the following sample test or wafer test or not, if the predicting answer is no, perform the step 203, and if the predicting answer is yes, perform a step 205 to keep the lot of products to continue the following processes and tests.

The prior methods use personal experience to determine analyzing results (such as in the step 103) or predict the following test results of the products (such as in the step 204), resulting in the accuracy and the reliability of the analyzing results doubtful. Furthermore, the human affairs in semiconductor manufacturing change frequently. Engineer's personal experience is difficult to transfer. The capacity of each engineer is limited, meaning the engineer is unable to look after the operation status of all of the equipment. When the test results of the semiconductor products indicate abnormalities, it is thus difficult for engineers, lacking in experience, to judge which point causes the problem to occur. Therefore, a lot of time is consumed to do related research, and even worse, wrong decisions are made. This will not only reduce the efficiency of processes, but also increase the cost. Furthermore, the in-line production status cannot be improved in time to increase the production yield.

It is therefore very important to provide an analytical-method to rapidly and correctly judge which point causes the problem to occur when the in-line QC test results of semiconductor products indicate abnormalities.

SUMMARY OF INVENTION

It is an object of the claimed invention to provide an analyticalmethod to rapidly and correctly judge which point causes the problem to occur when the in-line QC test results of semiconductor products indicate abnormalities.

It is another object of the claimed invention to provide an analyticalmethod to correctly predict the yield of semiconductor products in the subsequent process when the in-line QC test results of the semiconductor products indicate abnormalities.

It is a feature of the claimed invention to utilize the in-line QC test results, the wafer test parameters and the sample test parameters to generate a correlation between the subsequent process item and the in-line QC test item, and utilize the in-line QC test results to find out the abnormal equipment of each process step.

According to the claimed invention, the method for analyzing in-line QCtest parameters is used to analyze a plurality of lots of products, each lot of products having a lot number and being formed using a plurality of equipments. At least one wafer of each lot of products is tested by at least one in-line QC test item to generate an in-line QC test parameter. The in-line QC test item, a sample test item and a wafer test item related to the in-line QC test item are stored in a database. The database further stores the in-line QC test parameter and data of a plurality of lots of high-yield product stocks, such as various test items and test parameters. The method includes the following steps:

analyzing the in-line QC test parameter to determine whether the in-line QC test parameter corresponds to a predetermined spec or not;

searching the database to find out the sample test item or the wafer test item related to the in-line QC test item when the in-line QC test parameter does not correspond to the predetermined spec;

searching the database to find out the corresponding test parameters of the high-yield product stocks according to the in-line QC test item and the searched sample test item or the wafer test item; and generating a correlation to illustrate the relationship between the in-line QC test item and the sample test item, or the relationship between the in-line QC test item and the wafer test item according to the searched high-yield product stocks.

It is an advantage of the present invention that the products having high yield in the subsequent process are used to generate the correlation between the subsequent process item and the in-line QC test item, so that the yield of the semiconductor products in the subsequent process can be precisely predicted when the in-line QC test data of the semiconductor products are found abnormal. In addition, the in-line QC test results are used to find out the abnormal equipment of each process step, thus correctly judge which point causes the problem to occur when the in-line QC test results of the semiconductor products indicate abnormalities. As a result, human errors can be prevented, leading to higher processing efficiency, lower cost, and better in-line production status control to increase production yields.

These and other objects of the claimed invention will be apparent to those of ordinary skill in the art after reading the following detailed description of the preferred embodiment that is illustrated in the various figures and drawings.

DETAILED DESCRIPTION

Figure 1:
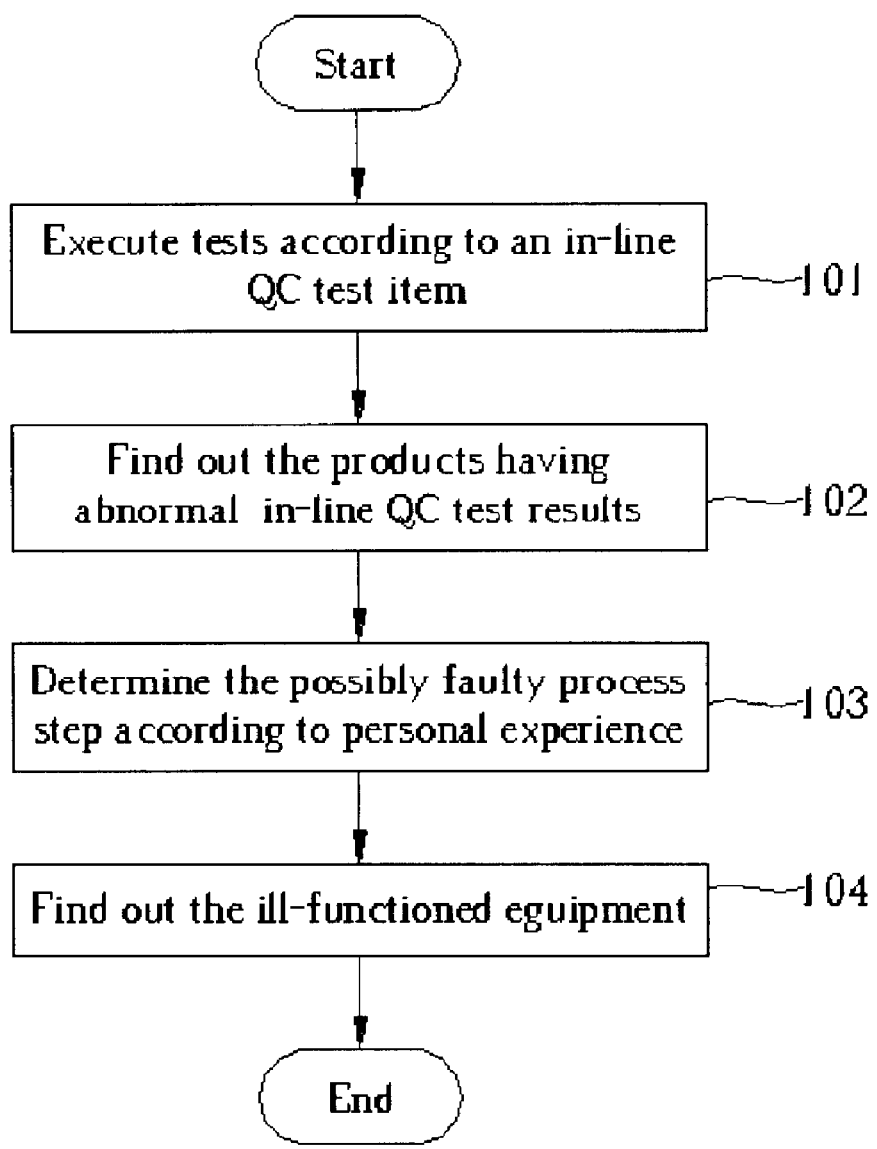
FIG. 1 is a flow chart of a prior art method for analyzing in-line QC test parameters.
Figure 2:
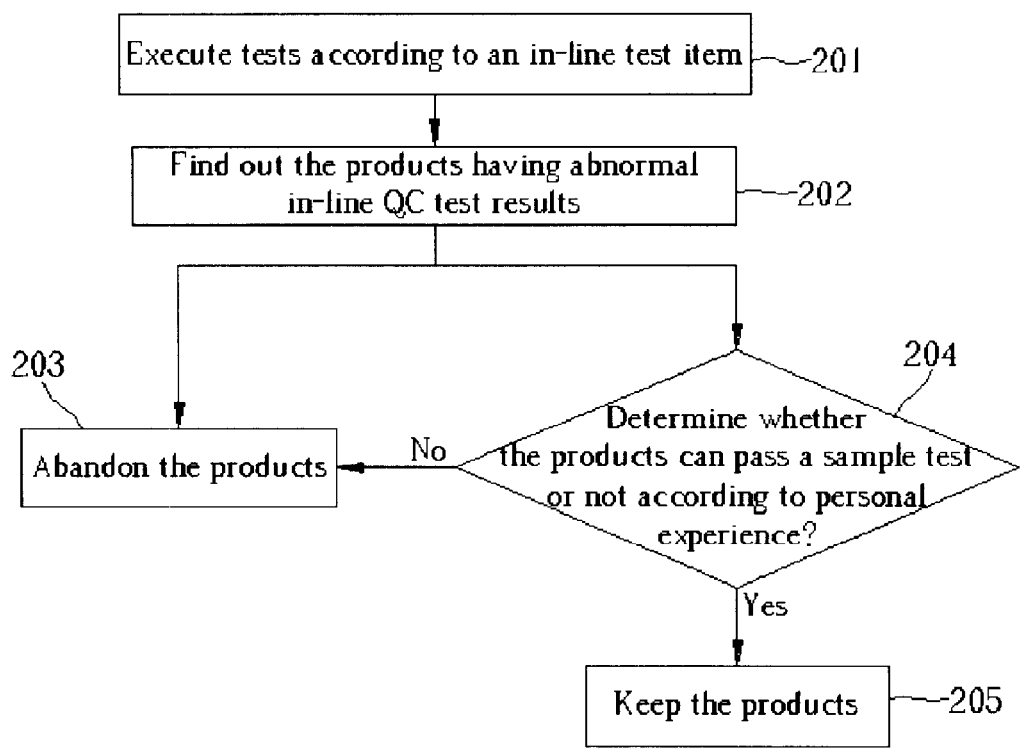
FIG. 2 is a flow chart of another prior art method for analyzing in-line QC test parameters.
Figure 3:
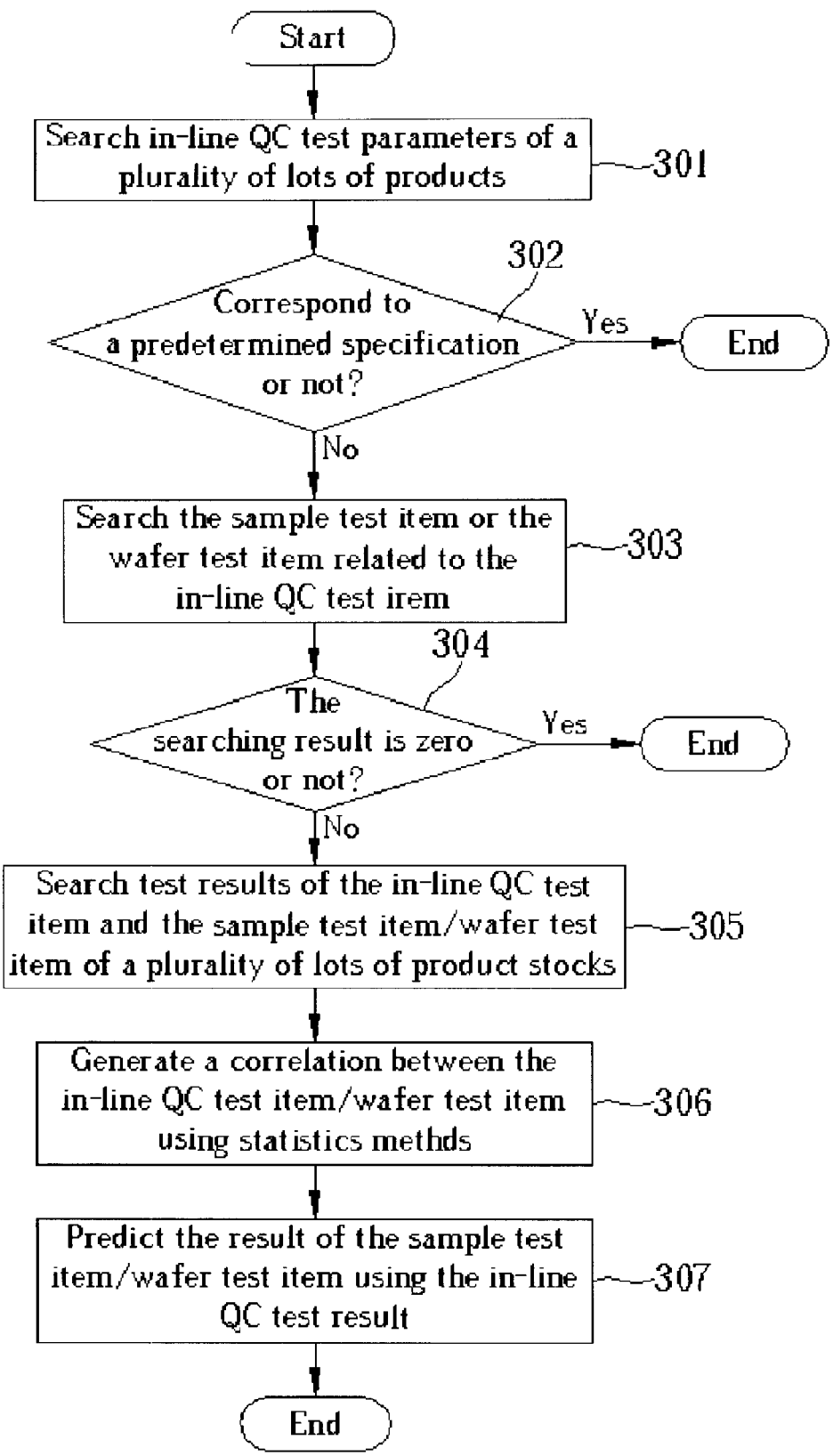
FIG. 3 is a flow chart of a method for analyzing in-line QC test parameters according to a preferred embodiment of the present invention.

Referring to FIG. 3 of a flow chart of a method for analyzing in-line QC test parameters according to a preferred embodiment of the present invention, a step 301 is first performed to search a plurality of lots of products which have been tested by an in-line QC test but not been tested by a sample test or a wafer test, and obtain the in-line QC test parameters of these products. The results searched in this step can be directly outputted to engineers, so that they can obtain information related to these products, such as lot numbers, fabrication time, and in-line QC test parameters.

A step 302 is then performed to analyze the in-line Qc test parameters and check whether these parameters correspond to a predetermined spec or not. For example, assume the in-line QC test item is an oxide-thickness item and has a predetermined spec of between 30–60 $\mu$m. The analysis result would correspond to the spec when the in-line QC test parameter (the oxide-thickness parameter) of the analyzed product is 50 $\mu$m, thus ending the analysis procedure. However, when the in-line QC test parameter (the oxide-thickness parameter) of the analyzed product is 90 $\mu$m, the analysis result does not correspond to the spec and a step 303 is thereafter performed. In addition, it is obvious that the in-line QC test item analyzed in the step 302 may further include a silicon nitride-thickness item, a polysilicon-thickness item, etc.

Following that, the step 303 is performed to search a database to find out the sample test item or the wafer test item related to the in-line QC test item. The database stores data of accumulative experiences that how the experienced engineers track problems, determine the abnormal in-line QC test item, and predict which sample test item or wafer test item is possible to have abnormal test results. For example, when the step 302 determines the in-line QC test parameter (the oxide-thickness parameter) of the analyzed product does not correspond to the spec, the step 303 may search the database to find out the sample test item related to the in-line QC test item (the oxide-thickness item), such as a capacitance item.

A step 304 is then performed to check whether the searching result of the step 303 is zero or not. If the searching result is zero (no sample test item or wafer test item is found in the step 303), the analysis procedure is ended. If the searching result is not zero, a step 305 is performed to search the database according to the in-line QC test item not corresponding to the predetermined spec (obtained in the step 302) and the sample test item or the wafer test item (obtained in the step 303), so as to find out the in-line QC test item and the sample test item or the wafer test item related to a plurality lots of high-yield product stocks. For example, when the in-line QC test item analyzed in the step 302 is the oxide-thickness item and the item obtained in the step 303 is the capacitance item, the step 305 is used to find out the items of oxide-thickness, capacitance and the parameters thereof of the product stocks. The product stocks refer to the products passing the sample test or the wafer test and having good test results and yields according to the present invention.

After test results of the in-line QC test item and the sample test item or the wafer test item of the product stocks are found, a step 306 is performed to obtain a correlation between the in-line QC test item and the sample test item or a correlation between the in-line QC test item and the wafer test item using statistics methods. In this embodiment, the step 306 uses a linear regression method to generate the correlation between the in-line QC test item and the sample test item/wafer test item. The correlation is listed below:

$$\text{the sample test parameter or the wafer test parameter} = a \times \text{the in-line QC test parameter} + b \quad (1)$$

For example, when the in-line QC test item analyzed in the step 302 is the oxide-thickness item and the item obtained in the step 303 is the capacitance item, the equation (1) can be rewritten as:

$$\text{the capacitance parameter} = a \times \text{the oxide-thickness parameter} + b \quad (2)$$

As a result, according to the correlation obtained in the step 306, engineers can easily use the in-line QC test result to predict the test result of the lot of products in the subsequent sample test item or the wafer test item, as shown in a step 307. For example, when the equation (2) is obtained in the step 306, the engineers may use the in-line QC test parameter not corresponding to the predetermined spec, such as the oxide-thickness parameter obtained in the step 302, and the equation (2) to predict the capacitance value in the step 307. Therefore, the engineers may determine the lot of products should be delivered to continue the next process or the lot of products should be abandoned to prevent low yield and cost waste according to the predicted capacitance value.

Figure 4:
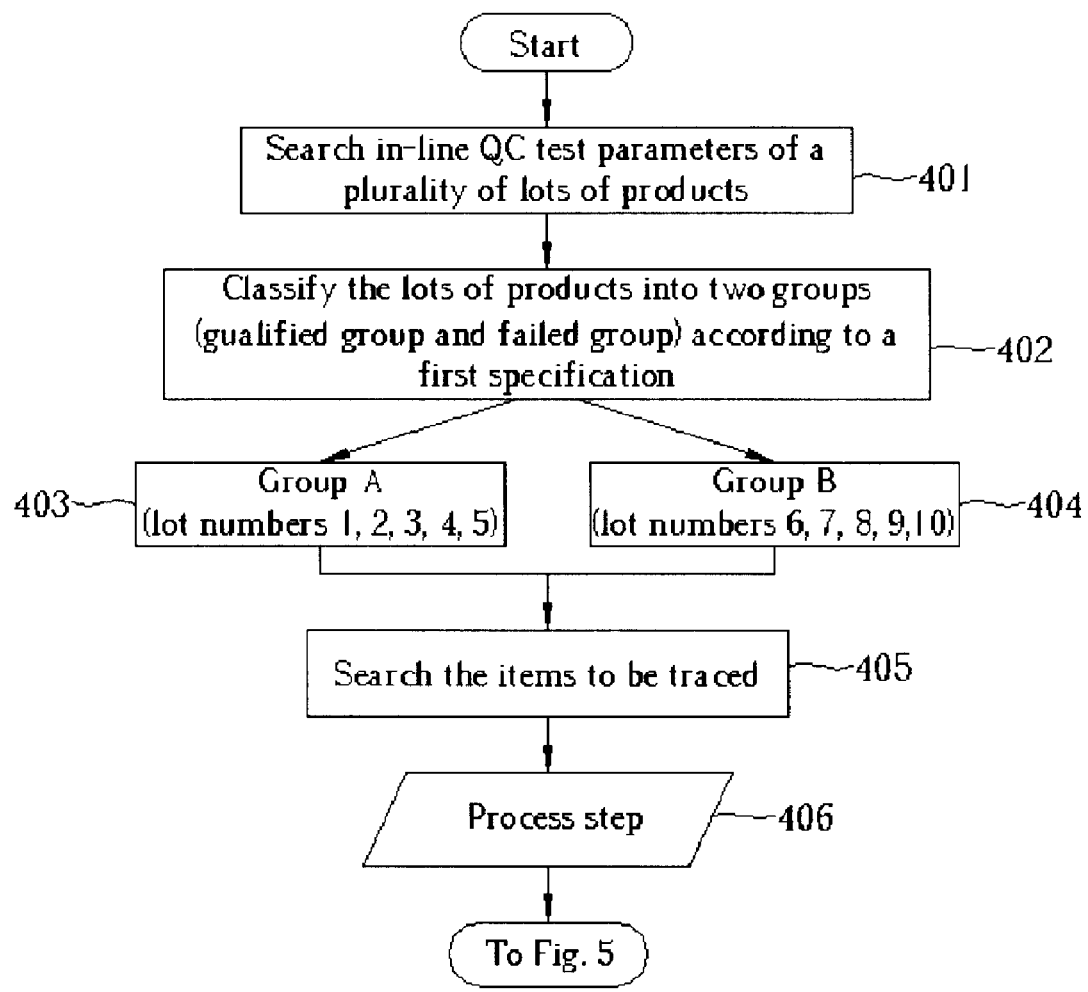
FIGS. 4 and 5 areflow charts of a method for analyzing in-line QC test parameters to find out the equipment resulting in low yield according to another preferred embodiment of the present invention.
Figure 5:
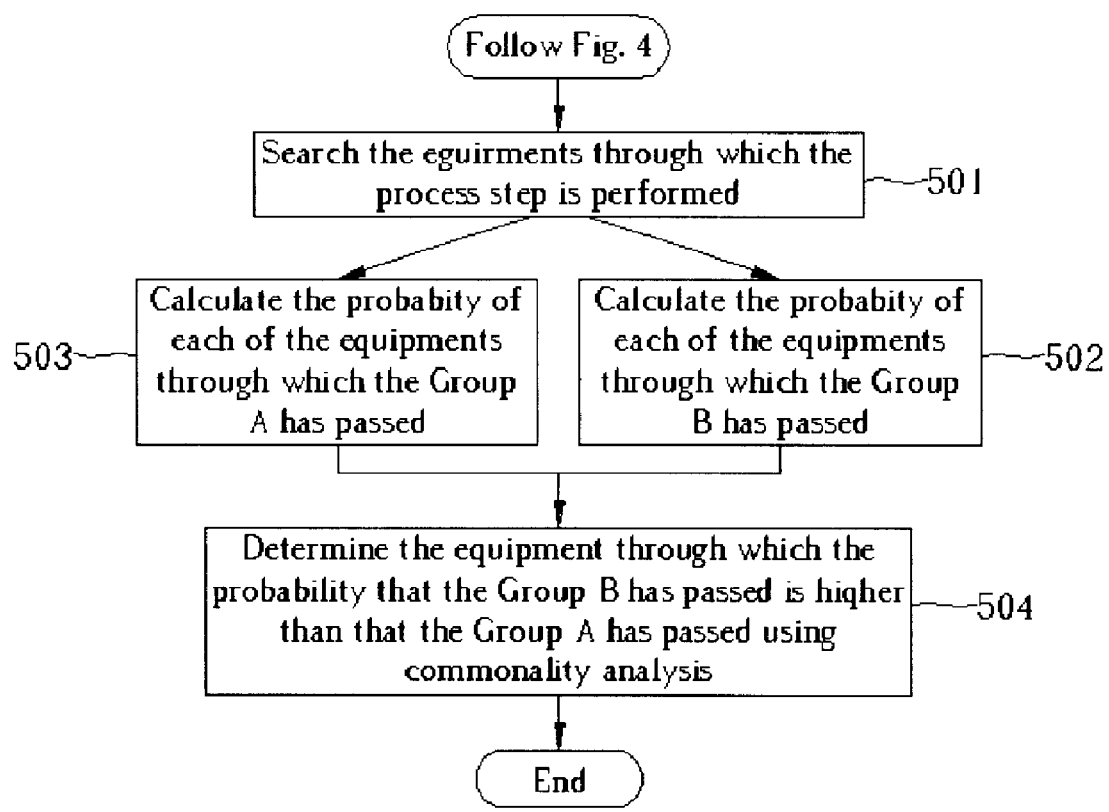

FIGS. 4 and 5 are flow charts of a method for analyzing in-line QC test parameters according to another preferred embodiment of the present invention. A step 401 is first performed to search a plurality of lots of products which have been tested by an in-line QC test but not been tested by a sample test or a wafer test, and obtain the in-line QC test parameters of these products. The results searched in this step can be directly outputted to engineers, so that they can obtain information related to these products, such as lot numbers, fabrication time, and in-line QC test parameters.

A step 402 is then performed to classify the plurality of lots of products into two groups of Group A and Group B depending on whether the lots of products correspond to a first spec of the in-line QC test item or not. For example, the lots of products corresponding to the first spec of the in-line QC test item, including the lot numbers 1, 2, 3, 4 and 5, are classify to the Group A as shown in a step 403. The lots of products not corresponding to the first spec of the in-line QC test item, including the lot numbers 6, 7, 8, 9 and 10, are classify to the Group B as shown in a step 404.

Therein, each lot of products has a lot number and twenty-five wafers. In addition, each lot of products is fabricated using a plurality of equipments. An in-line QC test item, such as an item A, refers to test a thickness of a deposition layer on at least one wafer in a lot and obtain the test parameter of the thickness of the deposition layer. Since each deposition layer has its own control spec, the wafer passes the in-line QC test item when the thickness of the deposition layer is within the control spec, and the wafer cannot pass the in-line QC test item and fails when the thickness of the deposition layer is out of the control spec.

Following that, a step 405 is performed to search useful information from an accumulative experience database. Conventionally, when the experienced engineers track problems, they need to find out the reason resulting in the failed in-line QC test item A, and usually they have to decide to track which related process step. The accumulative experience database stores these experiences of the experienced engineers, thus providing the computer an automatically tracking path. In addition, the computer is capable of updating the database to collect all new experiences of tracking the last problems.

After the step 405, since the in-line QC test item A fails, a step 406 is executed to indicate that the item to be tracked belongs to a certain process step.

Referring to FIG. 5 to continue the procedure shown in FIG. 4, a step 501 is then performed to search the process step to be tracked and find out the process step includes which equipments, such as the equipments E1, E2, E3, etc. Following that, a step 502 is performed to calculate the probability of each of the equipments through which the products of Group B have passed. In addition, a step 503 is performed to calculate the probability of each of the equipments through which the products of Group A have passed. Then, commonality analysis is used in a step 504 to find out the equipment has a higher probability of being used by the products of Group B. The equipment found in the step 504 is the possibly faulty equipment according to the method for analyzing the in-line QC test parameters of the present invention.

Figure 6:
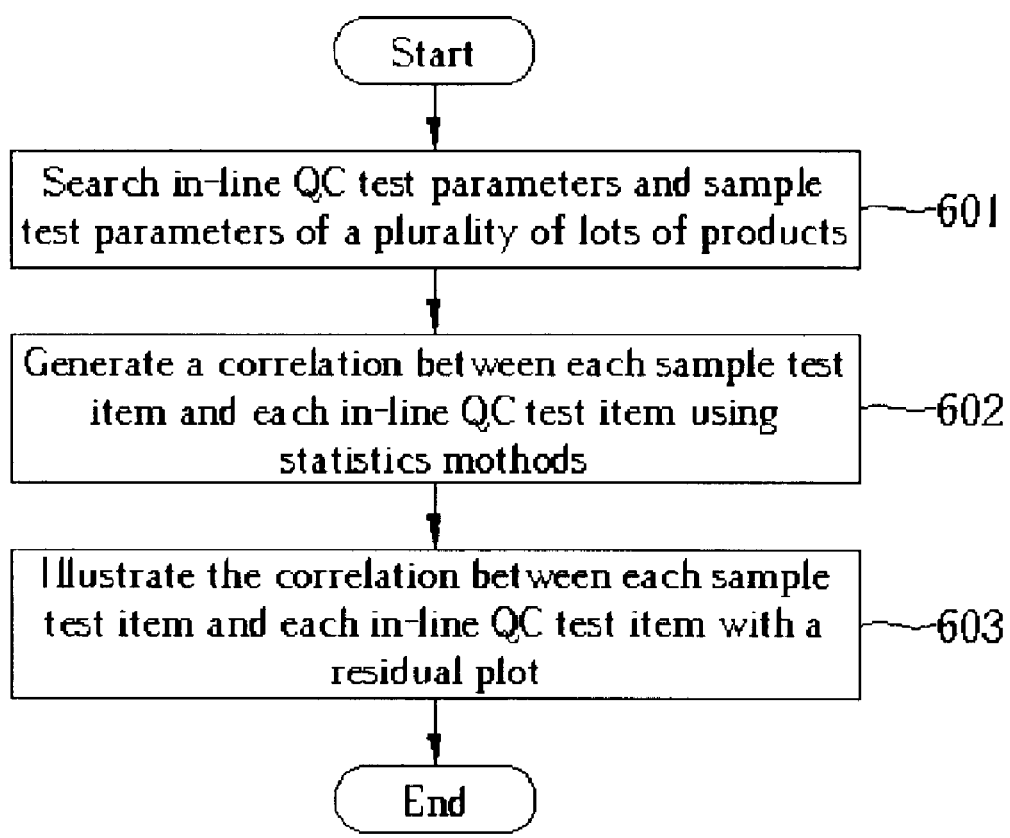
FIG. 6 is a flow chart of a method for analyzing in-line QC test parameters to find out the correlation between each sample test item and each in-line QC test item according to another preferred embodiment of the present invention.

As shown in FIG. 6 of another preferred embodiment of the present invention, a method for analyzing in-line QC test parameters is used to find out the correlation between each sample test item and each in-line QC test item. According to the correlation, engineers can predict and control effects of the in-line QC test result on the sample test result during the fabricating process.

A step 601 is first performed to search a plurality of lots of products which have been tested by an in-line QC test and a sample test, and obtain the in-line QC test parameters and the sample test parameters of these products. A step 602 is then used to obtain a correlation between the in-line QC test item and the sample test item using statistics methods. A multiple regression method is used to obtain the correlation between the in-line QC test item and the sample test item according to this embodiment. For example, a capacitor in a wafer is composed of an oxide layer, a silicon nitride layer and a polysilicon layer, so the capacitance of the capacitor is related to the thicknesses of the oxide layer, the silicon layer, and the polysilicon layer. A correlation obtained in the step 602 using the multiple regression method is listed below:

$$\text{the capacitance parameter} = a \times \text{the oxide-thickness parameter} + b \times \text{the silicon nitride-thickness parameter} + c \times \text{the polysilicon-thickness parameter} \quad (3)$$

In addition, other multiple regression methods can also be used to obtain the correlation between the sample test item and the in-line QC test item according to other embodiments of the present invention, such as a stepwise regression method, a forward method, a backward method, etc.

A residual plot can be used to illustrate the correlation between the sample test item and the in-line test item (as shown in a step 603), thus facilitating engineers to judge the correlation is practical or not from observing the residual plot.

Figure 7:
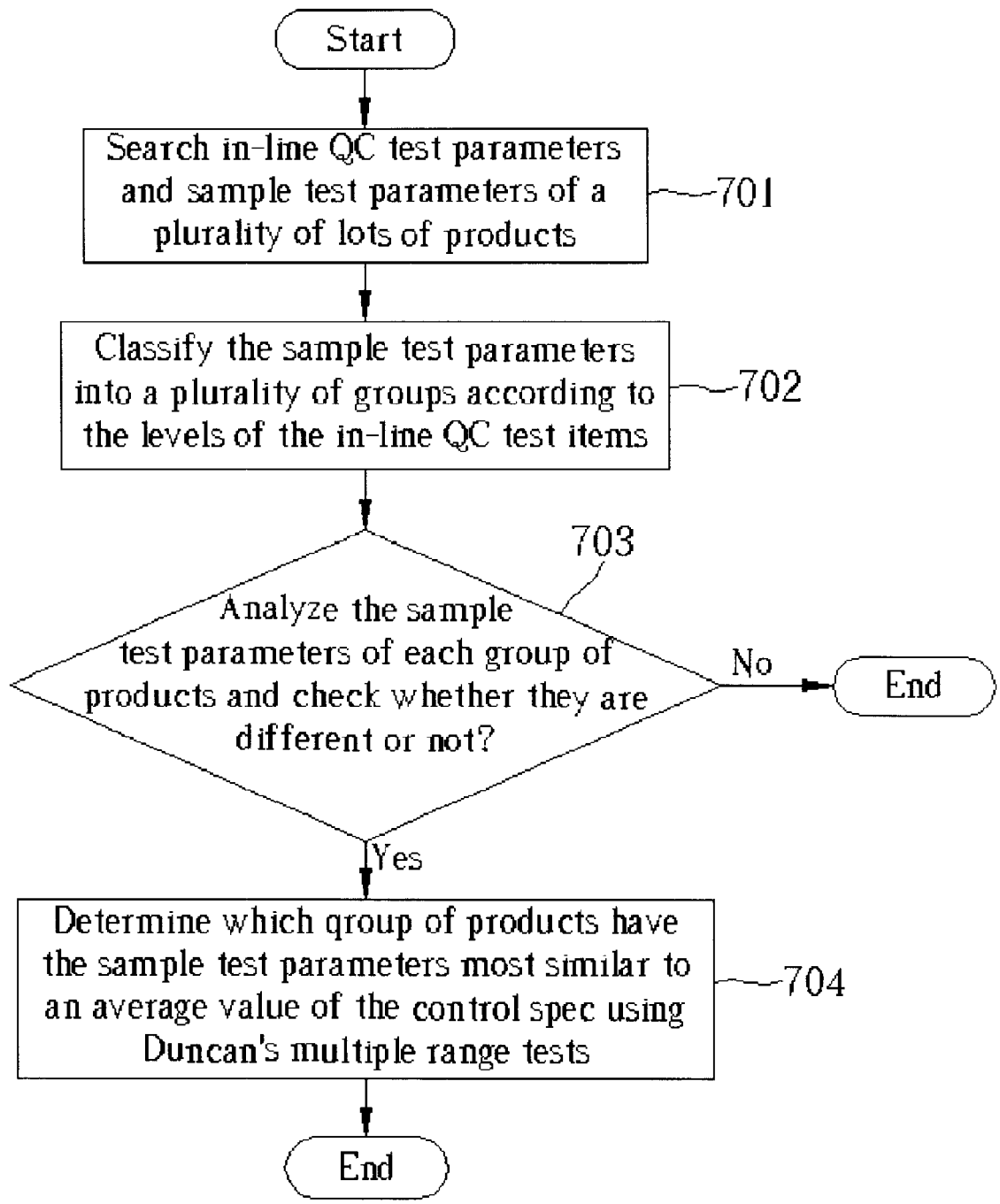
FIG. 7 is a flow chart of a method for analyzing in-line QC test parameters to find out the preferred operating conditions of each process step according to another preferred embodiment of the present invention.

As shown in FIG. 7 of another preferred embodiment of the present invention, a method for analyzing in-line QC test parameters is used to analyze a plurality of lots of products that have been tested by an in-line QC test and a sample test, so as to find out the preferred operating conditions of a process step before the in-line QC test and use these operating conditions for the subsequent products in the process step.

A step 701 is first performed to search a plurality of lots of products which have been tested by an in-line QC test and a sample test, and obtain the in-line QC test parameters and the sample test parameters of these products. A step 702 is then used to classify the sample test parameters into a plurality of groups according to the levels of the in-line QC test items. For example, the levels of the in-line QC test items such as the oxide-thickness item, the silicon nitride-thickness item and the polysilicon-thickness item are (high, medium, low). Specifically, if a lot of products has an oxide-thickness parameter higher than an average value of the control spec, a silicon nitride-thickness parameter about an average value of the control spec, and a polysilicon-thickness parameter lower than an average value of the control spec, the lot of products belongs to a group of (high, medium, low). If a lot of products has an oxide-thickness parameter lower than an average value of the control spec, a silicon nitride-thickness parameter lower than an average value of the control spec, and a polysilicon-thickness parameter higher than an average value of the control spec, the lot of products belongs to a group of (low, low, high).

Following that, a step 703 is performed to analyze the sample test parameters of each group of products and check whether they are different or not. An ANOVA analysis method is used to check whether the sample test parameters of each group of products are different or not according to this embodiment. If the sample test parameters of each group of products are found with no difference, the analysis procedure is ended. If the sample test parameters of each group of products are found different, the analysis procedure goes to a step 704.

In the step 704, a Duncans multiple range test is used to analyze which group of products have the sample test parameters most similar to the target of the control spec. A box plot is used to illustrate the data of each group of products, and the in-line QC test parameters of the chosen group of products in this step are used as a predetermined spec or control spec in the subsequent process. For example, if the (low, low, high) group of products have the best performance in the sample test, the predetermined value of the oxide-thickness parameter is suggested to set lower than an average value of the control spec, the predetermined value of the silicon nitride-thickness parameter is suggested to set lower than an average value of the control spec, and the predetermined value of the polysilicon-thickness parameter is suggested to set higher than an average value of the control spec in the fabrication process of the subsequent products.

It is an advantage of the present invention that the products having high yield in the subsequent process are used to generate the correlation between the subsequent process item and the in-line QC test item, so that the yield of the semiconductor products in the subsequent process can be precisely predicted when the in-line QC test data of the semiconductor products are found abnormal. In addition, the products having in-line QC test results within spec are used to find out the abnormal equipment of each process step, thus correctly judge which point causes the problem to occur when the in-line QC test results of the semiconductor products indicate abnormalities. As a result, human errors can be prevented, leading to higher processing efficiency, lower cost, and better in-line production status control to increase production yields.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for analyzing in-line quality control (QC) test parameters, the method being used to analyze a plurality of lots of products, each lot of products comprising a lot number, the products being formed using a plurality of equipments, at least one wafer of each lot of products being tested by at least one in-line QC test item to generate an in-line QC test parameter, the in-line QC test item, and its related sample test item and wafer test item being stored in a database, the database further storing the in-line QC test parameter and data of a plurality of lots of high-yield product stocks, such as test items and test parameters, the method comprising:

analyzing the in-line QC test parameter of the wafer to determine whether the in-line QC test parameter corresponds to a predetermined spec or not;

searching the database to find out the sample test item or the wafer test item related to the in-line QC test item when the in-line QC test parameter of the wafer does not correspond to the predetermined spec;

searching the database to find out the corresponding test parameters in the sample test item or the wafer test item of the high-yield product stocks according to the in-line QC test item and the searched sample test item or the wafer test item; and using the in-line QC test parameter of the wafer and the searched test parameters in the sample test item of the high-yield product stocks to generate a correlation to illustrate the relationship between the in-line QC test item and the sample test item and using the in-line QC test parameter of the wafer and the correlation to predict a test parameter for the wafer in the sample test item, or using the in-line QC test parameter of the wafer and the searched test parameters in the wafer test item of the high-yield product stocks to generate a correction to illustrate the relationship between the in-line QC test item and the wafer test item and using the in-line QC test parameter of the wafer and the correlation to predict a test parameter for the wafer in the wafer test item.

2. The method of claim 1 wherein the lots of products are not yet tested by the sample test item and the wafer test item but obtain the predicted test parameter for each wafer of the lots of products in the sample test item or the wafer test item using the in-line QC test parameter of the wafer and the correlation between the in-line QC test item and the sample test item or the wafer test item.

3. The method of claim 1 wherein the correlation between the in-line QC test item and the sample test item, and the correlation between the in-line QC test item and the wafer test item are generated using linear regression methods.

4. The method of claim 1 wherein the database stores data of a process step related to the in-line QC test item, and the method further comprises:

classifying the lots of products into two groups according to a first spec, the two groups of products comprising a qualified group of products corresponding to the first spec, and a failed group of products not corresponding to the first spec;

searching the database to find out the process step related to the in-line QC test item;

finding the equipments used in the process step according to the lot numbers of the two groups of products; and determining the equipment through which a probability that the failed group of products have passed is higher than a probability that the qualified group of products have passed.

5. The method of claim 4 wherein commonality analysis is used to determine the equipment through which a probability that a low-yield group of products have passed is higher than a probability that a high-yield group of products have passed.

6. The method of claim 1 further comprising:

searching test results of each of the sample test items and each of the in-line QC test items of the lots of products after a sample test process of the lots of products; and generating a correlation between each of the sample test items and each of the in-line QC test items according to the searching results.

7. The method of claim 6 wherein the correlation between each of the sample test items and each of the in-line QC test items is generated by a multiple regression model.

8. The method of claim 6 wherein the correlation between each of the sample test items and each of the in-line QC test items is generated by a stepwise regression model.

9. The method of claim 6 wherein the correlation between each of the sample test items and each of the in-line QC test items is illustrated by a residual plot.

10. The method of claim 1 further comprising:

searching test parameters of each of the sample test items and each of the in-line QC test items of the lots of products when the lots of products are tested by the sample test item;

classifying the lots of products into a plurality of groups according to the parameters of each of the in-line QC test items of the lots of products;

analyzing the sample test parameters of each group of products; and analyzing and obtaining the group of products having the sample test parameters most similar to a second spec when the sample test parameters of the groups of products are different.

11. The method of claim 10 wherein an ANOVA method is used to analyze whether the sample test parameters of the groups of products are different or not.

12. The method of claim 10 wherein a Duncan's multiple range test is used to analyze and obtain the group of products having the sample test parameters most similar to the predetermined spec.

13. The method of claim 10 wherein the classified lots of products are illustrated by a box plot.

14. The method of claim 10 wherein each of the in-line QC test parameters of the obtained group of products is used as a predetermined spec of the subsequent products.

15. A method for analyzing in-line quality control test parameters, the method being used to analyze a plurality of lots of products, each lot of products comprising a lot number, the products being formed using a plurality of equipments, at least one wafer of each lot of products being tested by at least one in-line QC test item to generate an in-line QC test parameter, the in-line QC test item, and its related sample test item and wafer test item being stored in a database, the database further storing the in-line QC test parameter, data of a process step related to the in-line QC test item, and data of a plurality of lots of high-yield product stocks, such as test items and test parameters, the method comprising:

classifying the lots of products being tested by the in-line QC test item into two groups according to a first spec, the two groups of products comprising a qualified group of products which has the in-line QC test parameters corresponding to the first spec, and a failed group of products which has the in-line QC test parameters not corresponding to the first spec;

searching the database to find out the process step related to the in-line QC test item;

finding the equipments used in the process step according to the lot numbers of the two groups of products;

determining the equipment through which a probability that the failed group of products have passed is higher than a probability that the qualified group of products have passed, the equipment having the higher probability that the failed group of products have passed through being the possibly faulty equipment;

searching the database to find out the sample test item or the wafer test item related to the in-line QC test item;

searching the database to find out the corresponding test parameters in the sample test item or the wafer test item of the high-yield product stocks according to the in-line QC test item and the searched sample test item or the wafer test item; and using the in-line QC test parameters of the failed group of products and the searched test parameters in the sample test item or the wafer test item of the high-yield product stocks to generate a correlation to illustrate the relationship between the in-line QC test item and the sample test item, or the relationship between the in-line QC test item and the wafer test item.

16. The method of claim 15 wherein the lots of products are not yet tested by the sample test item and the wafer test item and the correlation between the in-line QC test item and the sample test item or the wafer test item is utilized to predict test parameter for each wafer of the lots of products in the sample test item or the wafer test item.

17. The method of claim 15 wherein the correlation between the in-line QC test item and the sample test item, and the correlation between the in-line QC test item and the wafer test item arc generated using linear regression methods.

18. The method of claim 15 wherein commonality analysis is used to determine the equipment through which a probability that a low-yield group of products have passed is higher than a probability that a high-yield group of products have passed.

* * * * *